(Model.)
H. A. WILLIAMS.
GATE.
No. 250,615. Patented Dec. 6, 1881.
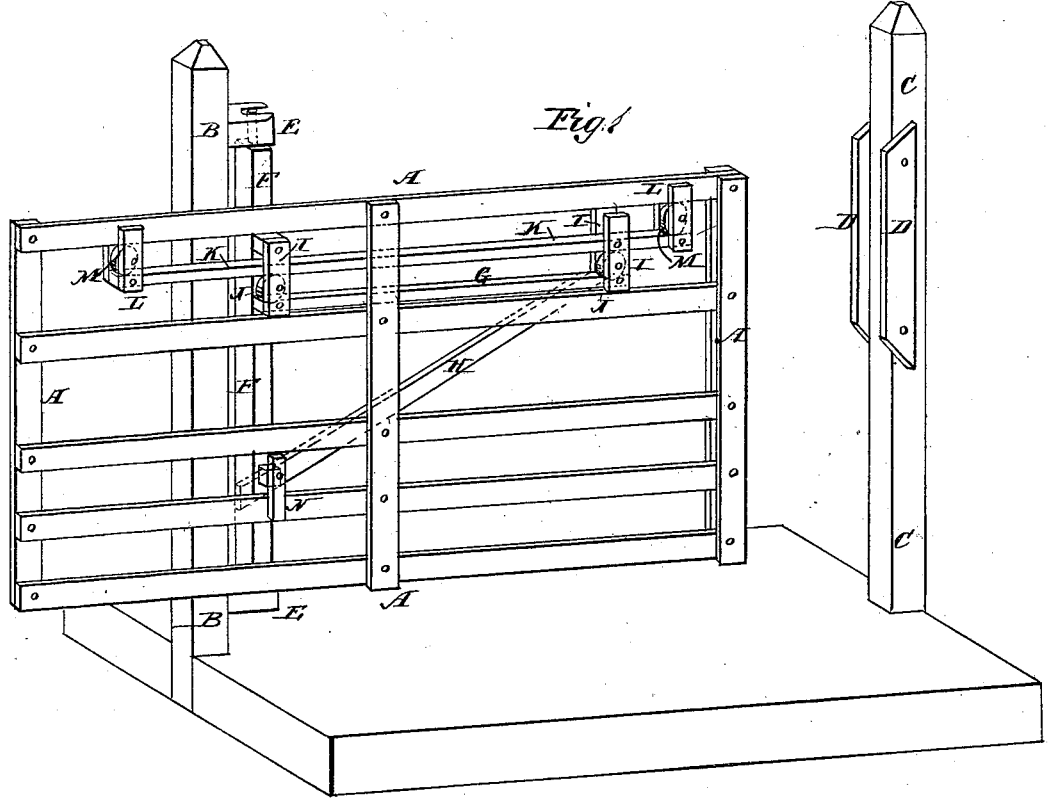
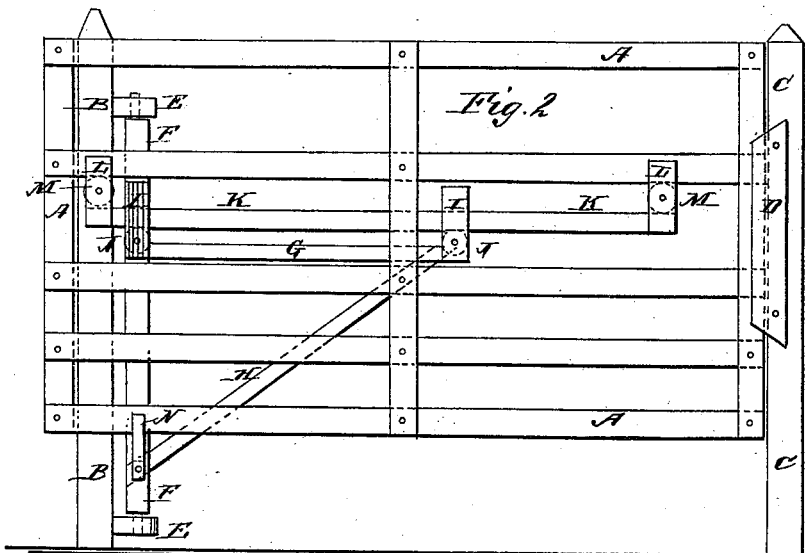
WITNESSES:
Frances McArdle
C. Sedgwick
INVENTOR:
H. A. Williams
BY Munn & Co.
ATTORNEYS.

UNITED STATES PATENT OFFICE.

HENRY A. WILLIAMS, OF PRINCETON, INDIANA, ASSIGNOR TO HIMSELF AND WILLIAM A. PRESTON, THOMAS WILLIAMS, AND ANDREW A. SHANNON, ALL OF SAME PLACE.

GATE.

SPECIFICATION forming part of Letters Patent No. 250,615, dated December 6, 1881.

Application filed September 12, 1881. (Model.)

*To all whom it may concern:*

Be it known that I, HENRY A. WILLIAMS, of Princeton, in the county of Gibson and State of Indiana, have invented a new and useful Improvement in Gates, of which the following is a full, clear, and exact specification.

Reference is to be had to the accompanying drawings, forming part of this specification, in which similar letters of reference indicate corresponding parts in all the figures.

Figure 1 is a perspective view of my improved gate, shown partly open. Fig. 2 is a side elevation of the same, shown as closed and raised from the ground.

The invention consists in the combination, with the gate and the hinged bracket, of the loose bar provided with rollers at its ends; also, in the combination, with the gate and the hinged bracket provided with guides and rollers, of the loose bar provided with guides and rollers at its end; and, also, in the combination, with the gate and the rear post, of the hinged bracket having guides, and the horizontal bar having guides, all as hereinafter more fully described.

A is the gate, which is formed of horizontal bars connected by upright bars. B is the rear or hinge post, and C is the forward or latch post.

To the sides of the post C are attached cleats D, to form a groove upon the inner side of the said post, to receive the forward end of the gate A when the said gate is closed.

To the inner side of the rear post, B, are attached bearings E, in which work the ends of the upright bar F, or tenons or pivots formed upon or attached to the said ends.

To the bar F, at a little distance from its upper end, is attached the end of a horizontal bar, G, which is made of such a length that its outer end extends a little beyond the center of the gate A. The bar G is strengthened in position by the brace-bar H, the upper end of which is attached to the outer end of the said bar G, and its lower end is attached to the upright bar F at a little distance from its lower end. The three bars F G H thus form a hinged bracket. To each end of the horizontal bar G are attached the lower ends of two short parallel uprights, I, to and between the lower parts of which is pivoted a small roller, J, for the loose bar K to roll upon, the upper ends of the said bars I serving as guards to keep the said bar K in place.

To each end of the bar K are attached two short uprights, L, to and between the lower parts of which is pivoted a small roller, M, for a horizontal bar of the gate A to rest and roll upon, the upper ends of the bars L serving as guards to keep the said bar in place.

To the bars F H, at their point of intersection, is pivoted a button, N, to hold the lower part of the gate A in place against the bracket F G H and prevent the said gate from being raised off the bar K.

The gate is opened by running it back a greater or less distance, or until the forward bars, I L, and the front end bars of the gate come in contact with each other. The gate is then swung around parallel with the roadway. The gate is closed by swinging it around across the roadway and then sliding it forward against the post C.

With this construction the gate A is supported near its ends by the rollers M of the bar K, so that it will always be in a horizontal position, and can thus be easily operated.

With this construction, also, by turning the button N into a horizontal position the lower part of the gate A can be swung forward, and the said gate can then be raised off the rollers M, so that the gate can be adjusted with its lower edge near the ground, as shown in Fig. 1, or with its lower edge raised from the ground, as shown in Fig. 2, to allow sheep and hogs to pass through beneath the gate, while preventing the passage of large animals. The adjustment also allows the gate to work over snow without having its movements impeded.

Having thus fully described my invention, I claim as new and desire to secure by Letters Patent—

1. The combination, with the gate A and the hinged bracket F G H, of the loose bar K, provided with rollers at its ends, substantially as and for the purpose set forth.

2. The combination, with the gate A and the hinged bracket F G H, provided with guides I and rollers J, of the loose bar K, provided with the guides L and the rollers M at its ends, substantially as and for the purpose set forth.

3. The combination, with the gate A and the rear post, B, of the hinged bracket F G H, having guides I, and the horizontal bar K, having guides L, substantially as herein shown and described, whereby the gate can be readily opened and closed and will be kept horizontal, as set forth.

HENRY A. WILLIAMS.

Witnesses:
THOMAS R. PAXTON,
LUCIUS C. EMBREE.